No. 886,406. PATENTED MAY 5, 1908.
W. C. RARIG.
RAKE.
APPLICATION FILED DEC. 11, 1905.
2 SHEETS—SHEET 1.
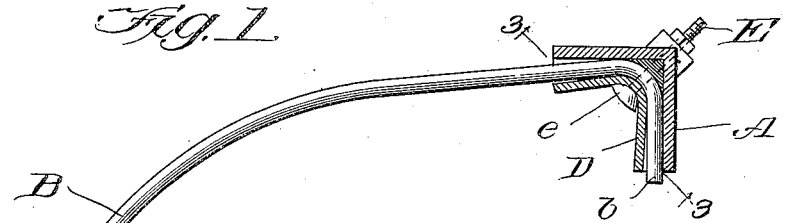
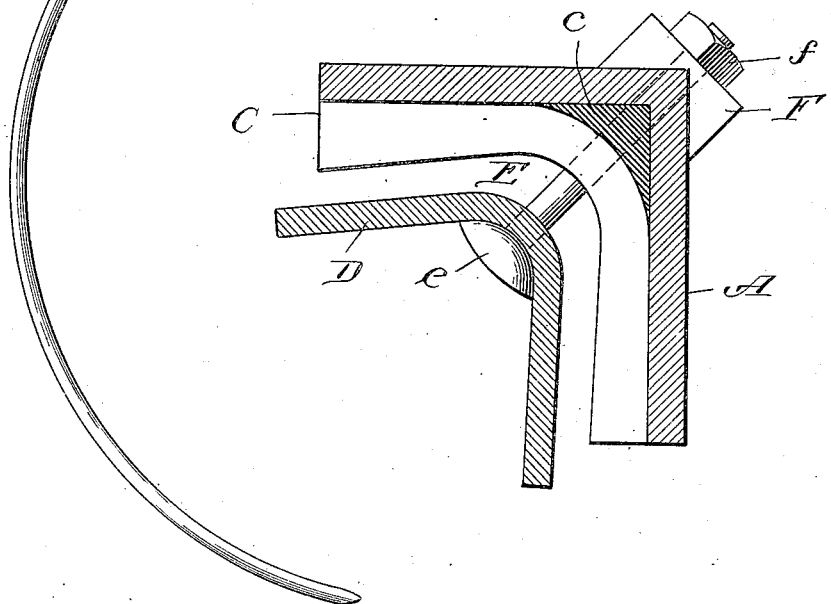
Witnesses:
H. S. Gaither
C. A. Muller
Inventor:
Welden C. Rarig
by Chamberlin & Wilkinson
attys

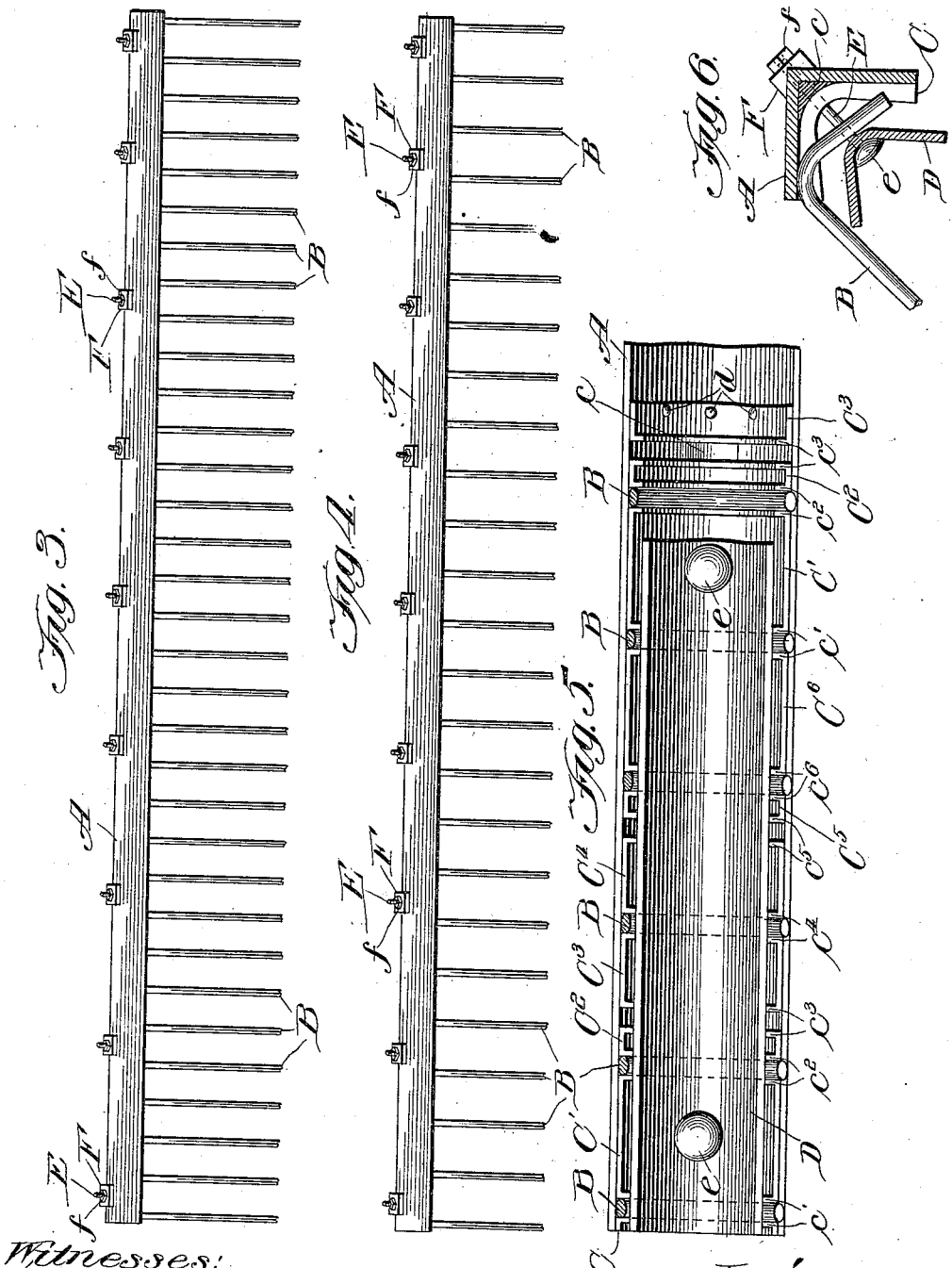

UNITED STATES PATENT OFFICE.

WELDEN C. RARIG, OF OGDEN, UTAH.

RAKE.

No. 886,406.  Specification of Letters Patent.  Patented May 5, 1908.

Application filed December 11, 1905. Serial No. 291,208.

*To all whom it may concern:*

Be it known that I, WELDEN C. RARIG, a citizen of the United States, residing at Ogden, county of Weber, State of Utah, have invented a certain new and useful Improvement in Rakes, and declare the following to be a full, clear, and exact description of the same, such as will enable others skilled in the art to which it pertains to make and use the same, reference being had to the accompanying drawings, which form a part of this specification.

My invention relates in general to rakes, and more particularly to means for securing the teeth to the rake heads.

In many parts of the world it is desirable in the use of rakes to have the teeth spaced different distances apart according to the work to be performed. For instance, when a rake of the usual size, ten feet, is employed at times it is desirable that it should comprise 26 teeth and at other times 34 teeth. Rakes are manufactured at the present time with different numbers of teeth spaced equal distances apart, but it has heretofore been necessary to provide differently constructed rake heads and clamping means according to the number of teeth secured to the rake head.

The primary object of my invention is to provide a rake in which different numbers of teeth spaced equal distances apart may be used without changing the construction of the rake head or the means for securing the teeth to the head.

A further object of my invention is to provide a rake in which the desired number of teeth may be easily secured to or detached from the rake head thereby permitting the number of teeth to be readily changed at any time according to the character of the work which is to be done.

A still further object of my invention is to provide a rake the teeth of which will be so secured to the head as to permit a movement of the teeth relatively to the head when an obstruction is engaged, thereby relieving the strain upon the teeth and preventing their being broken.

The embodiment of my invention herein disclosed may be generally described as comprising an angular rake head, a plurality of teeth each having its upper end bent at an angle to but in the same plane as the balance of the tooth, a holding block secured to the rake head, pairs of flanges projecting from the holding block which form channels to receive the bent upper ends of the teeth, webs between the flanges in the several pairs uniting the sections of the holding block and constituting curved bearings for the curved portions of the teeth, an angular plate bearing against the edges of the flanges and retaining the teeth within the channels formed between the pairs of flanges, and means for detachably securing such retaining plate to the rake head.

My invention will be more fully described hereinafter with reference to the accompanying drawing in which the same is illustrated as embodied in a convenient and practical form, and in which,—

Figure 1 is a side elevational view of a tooth with the head in cross section; Fig. 2 an enlarged sectional view of the rake head showing the teeth retaining means in position to permit the insertion or removal of the teeth; Fig. 3 a plan view showing a maximum number of teeth secured to the rake head; Fig. 4 a plan view showing a minimum number of teeth secured to the rake head; Fig. 5 a sectional view on line 3—3 Fig. 1; and Fig. 6 a sectional view similar to Fig. 2 showing a tooth when being removed or inserted between the rake head and retaining plate.

The same reference characters are used to designate the same parts in the several figures of the drawing.

Reference letter A indicates the rake head to which the teeth are secured, such head being of any suitable construction and of any desired length. The head is preferably angular in cross section and is composed of steel in order that it may have the requisite structural strength. The head is supported upon the rake in any suitable manner which need not be shown, as the same forms no part of my invention.

B indicates one of the teeth, the upper end $b$ of which is bent at an angle to, but in the same plane as the rest of the tooth. The bent portion $b$ of each tooth is united to the rest of the tooth by a curved intermediate portion.

C indicates a holding block for securing a plurality of teeth to the head A. The holding block is provided with a plurality of pairs of flanges between which are received the upper ends of the teeth. The section of the holding block on which is formed one flange of each of the adjacent pairs of flanges is secured to the sections of the block on each side thereof by integral webs $c$, such webs being of a cross section to fit within the angle of the rake head A and being curved to afford a bearing for the curved intermediate portion of the rake tooth between the adjacent pair of flanges. By reference to Fig. 5 it will be seen that the section $C'$ of the holding block has provided thereon a flange $c'$ at one side and a flange $c^2$ at the other side and is united to the adjacent section $C^2$ by the web $c$. The section $C^2$ is provided with a flange $c^2$ which together with the flange $c^2$ on the section $C'$ forms a channel to receive the bent upper end of a tooth. The section $C^2$ is also provided with a flange $c^3$ and is united to the adjacent section $C^3$ by a web $c$. In a similar manner the sections $C^3$, $C^4$, $C^5$ and $C^6$ are provided with flanges coöperating with flanges on the adjacent sections to form pairs between which the rake teeth are received.

The sections of the holding block are different lengths so that the pairs of flanges are different distances apart, thereby permitting the teeth to be so arranged as to result in different numbers of teeth spaced equal distances apart being secured to the rake head. For instance when a minimum number of teeth is desired, as shown in Fig. 4, they are located in channels between the flanges $c'$, $c^3$, & $c^5$ while, when a maximum number of teeth is to be employed, as shown in Fig. 3, they are seated within the channels formed between the pairs of flanges $c'$, $c^2$, $c^4$ & $c^6$. In either instance the teeth are secured equal distances apart.

In order that the teeth may be retained within the channels formed between the pairs of flanges an angle plate D, preferably formed of steel, is provided which is retained in contact with the outer edges of the flanges. The retaining plate D may be conveniently secured to the rake head and thereby held in contact with the flanges by means of bolts E extending through holes in the retaining plate and through holes along the angle of the rake head. The heads $e$ of the bolts are preferably made to conform to the curvature within the angle of the retaining plate. The bolts after passing through the rake head extend through washers such as F having angular grooves to fit upon the angle of the rake head. A nut such as $f$ engages the screw-threaded end of each bolt and bears against the outer surface of the corresponding washer F.

When it is desired to secure the teeth to the rake head either when the rake is assembled or when it is desired to change the number of teeth, the several bolts are unscrewed as shown in Fig. 2, thereby permitting the retaining plate D to fall away from the rake head so that the bent upper ends of the teeth may be readily inserted within the channels formed between the pairs of flanges on the retaining block C. After the desired number of teeth have been located within the channels between the pairs of grooves the nuts on the ends of the bolts are rotated so as to draw the retaining plate D into close contact with the edges of the flanges.

By merely partially unscrewing the bolts E from the nuts the plate D will fall away from the rake head, without being detached therefrom, a sufficient distance to permit the insertion or removal of the bent portions of the teeth or to permit the re-arrangement of the teeth as may be desired to vary the number of teeth and at the same time space them equal distances apart. After the insertion of new teeth or the re-arrangement of the teeth the bolts may be rotated with respect to the nuts so as to again tightly clamp the retaining plate against the flanges on the block.

By providing the channels to receive the bent portions of the teeth on the rake head rather than in the retaining plate, as is done in my prior patent 789,670, the teeth may be more readily removed or rearranged inasmuch as the bent portions thereof fall by gravity from the channels and rest upon the smooth surface of the retaining plate, whereas when the channels are formed in the retaining plate it is necessary that each tooth should be lifted in order to disengage the bent portions thereof from the surrounding channel.

It will be observed by reference to Fig. 2 that the flanges are of such dimensions that the curved portions of the teeth will be permitted only a slight play between the retaining plate D and the several webs $c$, while the portions of the teeth at each side of the curved intermediate portions will be allowed a play between the rake head and the retaining plate. By so forming the flanges the teeth are allowed a longitudinal and oscillatory movement relatively to the head to prevent the breaking of the teeth when fixed objects are engaged thereby, in a manner fully set forth in my prior United States patent No. 789,670 granted to me May 9, 1905.

The block carrying the flanges is preferably made of malleable iron while the retaining plate D is preferably made of steel thereby imparting additional strength to the rake head and permitting the latter to be made of metal of less thickness than would otherwise be necessary.

The retaining plate D when secured to the rake head in the position shown in Fig. 1 serves in connection with the rake head to form a trussed structure possessing such strength that the thickness of the rake head may be less than would otherwise be necessary if in lieu of the continuous retaining plate short retaining holders were employed as is the case in the structure covered by my prior patent.

The holding plate not only serves to retain the teeth within the channels between the flanges, but also acts as a cushion for the teeth when they are moved suddenly in either direction by contact with fixed objects. This cushion resulting from the holding plate together with the resiliency of the teeth affords such elasticity as to obviate the necessity of providing one or more coils in the teeth, thus materially reducing the cost of the teeth over those provided with coils and also rendering the teeth more durable, as it is well known that the breaking of the teeth always occurs where the metal has been strained in the formation of the coils.

From the foregoing descripton it will be observed that I have invented an improved rake so constructed that the number of teeth may be readily changed to conform to the work desired, and which, though simple in construction, is strong and durable.

Having now fully described my invention, what I claim as new and desire to secure by Letters Patent is:

1. In a rake, the combination with a head, of a plurality of teeth each having a portion bent at an angle to and in the same plane as the balance of the tooth, a plurality of pairs of flanges permanently secured to said head forming channels to receive the portions of the teeth adjacent the bends therein, and means for detachably retaining the teeth within said channels.

2. In a rake, the combination with a head, of a plurality of teeth each having a portion bent at an angle to and in the same plane as the balance of the tooth, a holding block secured to said head, a plurality of pairs of flanges carried by said block forming channels to receive the teeth adjacent the bent portions thereof, and means for detachably retaining the teeth within said channels.

3. In a rake, the combination with a head, of a plurality of teeth each having a portion bent at an angle to and in the same plane as the balance of the tooth, a holding block secured to said head having channels therein to receive the teeth adjacent the bent portions thereof, and means for detachably retaining the teeth within said channels.

4. In a rake, the combination with a head, of a plurality of teeth each having an angular bent portion at its upper end, a plurality of pairs of flanges secured to said head forming channels to receive the bent portions of the teeth, a continuous plate resting against the edges of said flanges to retain the teeth within said channels, and means for detachably securing said plate to said head.

5. In a rake, the combination with a head, of a plurality of teeth each having an angular bent portion at its upper end, a plurality of pairs of flanges secured to said head forming channels to receive the teeth adjacent their bent upper ends, said pairs of flanges being spaced different distances apart whereby different numbers of teeth spaced equal distances apart may be secured to said head, and means for detachably retaining the teeth within said channels.

6. In a rake, the combination with a head, of a plurality of teeth each having an angular bent portion at its upper end, a plurality of pairs of flanges secured to said head forming channels to receive the bent portions of the teeth, a continuous plate resting against the edges of said flanges to retain the teeth within said channels, and bolts extending through said plate and head for detachably securing the former to the latter.

7. In a rake, the combination with a head formed of an angle plate, of a plurality of teeth each having an angular bent portion at its upper end, a holding block secured to said head having grooves therein to receive the portions of the teeth adjacent their bent upper ends, a continuous plate formed of angle metal for retaining the teeth within said grooves, and means for detachably securing said plate to said head.

8. In a rake, the combination with a head, of a plurality of teeth each having an angular bent upper end, a holding block secured to said head, a plurality of pairs of flanges carried by said block forming channels to receive the teeth adjacent the bent upper ends thereof, webs intermediate of the flanges forming the several pairs uniting the adjacent portions of said block, said webs having curved seats against which the curved portions of the teeth rest, and means for detachably retaining the teeth within said channels.

9. In a rake, the combination with a head, of a plurality of teeth each having a portion bent at an angle to and in the same plane as the balance of the tooth, a plurality of pairs of flanges permanently secured to said head forming channels to receive the teeth adjacent the bent portions thereof, said flanges being of greater width at each side of the bend in the teeth whereby a longitudinal and oscillatory movement of the teeth relatively to the supporting head is permitted, a continuous plate resting against the edges of said flanges to retain the teeth within said channels, and means for detachably securing said plates to said head.

10. In a rake, the combination with a head angular in cross section, of a plurality of teeth each having an angular bent portion at its upper end lying within the angle of said head, a retaining plate angular in cross-section underlying the bent portions of the teeth, said head and plate having channels between the same to receive the bent portions of the teeth, the channels being spaced different distances apart in such a manner that different numbers of teeth spaced equal distances apart may be secured to said head, and means for detachably securing said plate to said head.

11. In a rake, the combination with a head, of a plurality of teeth having bent upper ends, and a holding block secured to said head and having a plurality of channels spaced different distances apart in such a manner that different numbers of teeth spaced equal distances apart may be secured to the head.

12. In a rake, the combination with a head, of a holding block adapted to secure a plurality of teeth to the rake head comprising a plurality of pairs of flanges forming channels to receive the bent upper ends of the teeth, webs intermediate of and connecting the flanges forming the several pairs uniting the adjacent portions of said block, and means for detachably retaining the teeth within said channels.

13. In a rake, the combination with a head angular in cross-section, of a plurality of teeth, each having an angular bent portion at its upper end lying within the angle of said head, a continuous plate angular in cross-section underlying the bent portions of the teeth, said head and plate having channels between the same to receive the bent portions of the teeth, and bolts extending diagonally through the plate and head adjacent their angles, whereby loosening of the nuts on the bolts will permit a partial separation of the plate from the head without disconnecting the plate from the head.

In testimony whereof, I sign this specification in the presence of two witnesses.

WELDEN C. RARIG.

Witnesses:
A. L. BREWER,
W. F. RUDIGER.